United States Patent [19]

Muller

[11] 4,426,200

[45] Jan. 17, 1984

[54] ROLLING PIN APPARATUS

[76] Inventor: Sylvio Muller, 21 Brookdale Rd., Glen Cove, N.Y. 11542

[21] Appl. No.: 423,670

[22] Filed: Sep. 27, 1982

[51] Int. Cl.³ .................. A21C 3/02; B29C 15/00; B29D 7/14
[52] U.S. Cl. ..................................... 425/101; 7/111; 29/110.5; 425/230; 425/374; 425/458
[58] Field of Search .............. 425/87, 230, 225, 363, 425/374, 458, 90, 96, 101; 7/111; 29/110.5, 115, 130

[56] References Cited

U.S. PATENT DOCUMENTS

| 66,909 | 7/1867 | Taylor | 29/110.5 |
| 132,736 | 11/1872 | Peirce | 29/110.5 |
| 2,066,899 | 1/1937 | Parsons | 425/101 |
| 3,127,299 | 3/1964 | Hecht | 29/110.5 |
| 3,244,122 | 4/1966 | Agler | 29/110.5 |

FOREIGN PATENT DOCUMENTS 2917 of 1912 United Kingdom ............ 29/110.5

*Primary Examiner*—Willard E. Hoag
*Attorney, Agent, or Firm*—Robert D. Farkas

[57] ABSTRACT

A rolling pin apparatus utilizes a pair of free wheeling right angle cylinders disposed in parallel relationship for application to a food work stuff. A chamber is secured to the structure supporting the journals carrying the two cylinders, which chamber is covered by a removable access cover. An inertia operated pendulum-like scraper rides over a screen, both disposed within the chamber so as to break up and dispense a dusting material, usually flour, directing same towards the bottom of the chamber. An elongated valve is connected to the bottom of the chamber and positioned over the cylinders so as to control the amount of flour dispensed onto the outermost areas of each of the cylinders, directed there by two vanes positioned intermediate the chamber and the cylinders. A third vane also acts as an elongated scraper so as to remove extraneous material collected on the surfaces of the cylinders at locations intermediate opposed faces thereof.

13 Claims, 6 Drawing Figures

U.S. Patent  Jan. 17, 1984  4,426,200
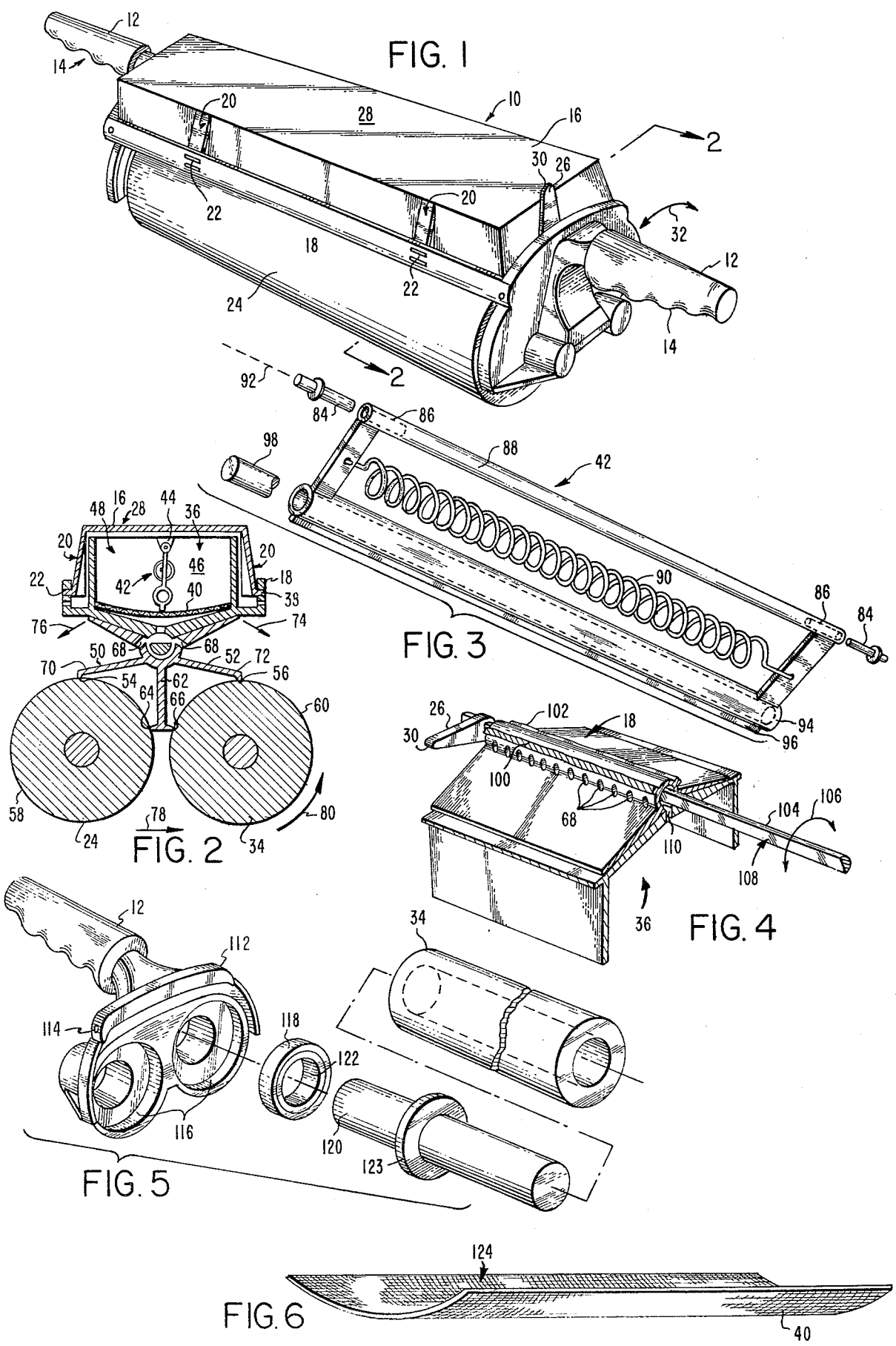

ROLLING PIN APPARATUS

BACKGROUND OF THE INVENTION

1. The Field of the Invention

The present invention relates to food machinery, and more particularly to that class of rolling pin apparatus which is utilized to work, flatten, stretch out or otherwise prepare dough-like materials in a flattened, stretched and elongated shape.

2. Description of the Prior Art

Rolling pins are undoubtedly one of the oldest known implements used in the preparation of breads, cakes, pastry and other food stuffs. Not only is wheat flour so manipulated, but other grains have been similarly worked by the well known single cylinder pin, having attached to it, in its least sophisticated form two coaxially aligned handles, some versions of which being journaled so as to prevent friction of the handles wearing upon a user's hand. The use of a conventional rolling pin provides for at least line contact with the food stuff to be worked and requires some manipulative skill to avoid undulations in the uppermost worked surface. If a sudden pressure is brought to bear by the user, an elongated trough is formed in the work, requiring later manipulations to eliminate same. In addition, the conventional and well known rolling pin requires frequent dusting, usually of a dry flour-like material, to prevent sticking of the working surface of the pin to the usually more moist uppermost surface of the food stuff being worked.

The present invention seeks to overcome problems associated with the prior art by providing a dual pin apparatus which automatically dispenses the dusting powder or flour, thereby preventing, or at least minimizing, the inadvertent depressions one experiences when working dough, whilst covering the dough with a minimum amount of screened and well distributed dusting powder—so as to eliminate sticking.

SUMMARY OF THE INVENTION

Therefore, a primary object of the present invention is to provide a rolling pin apparatus which permits a user to apply two lines of a downward work pressure to the work piece.

Another object of the present invention is to provide an apparatus wherein all parts of the working tool contacting the food stuff to be worked, are covered by a fine dusting powder automatically as the work piece is manipulated.

Still another object of the present invention is to provide an apparatus wherein the dusting powder is distributed evenly over the working surfaces of the device.

Yet another object of the present invention is to provide an apparatus which permits easy cleaning, when not in use.

A further object of the present invention is to provide an apparatus which automatically scrapes unwanted particles of food stuff from its food contacting rollers as such rollers are moved about the work piece by the user.

These objects, as well as further objects and advantages, of the present invention, will become more readily apparent after reading the description of a non-limiting illustrative embodiment and the accompanying drawing.

A rolling pin apparatus according to the principles of the present invention includes a pair of elongated right angle cylinders disposed in spaced apart parallel arrangement, a chamber disposed over such pair of rollers, the chamber being secured to a structure bearing journals, the journals providing rotative support to the cylinders, the chamber having in its lowermost face a valve substantially extending along the length of and centered above the cylinders. The chamber also includes an inertially operated pendulum-like device extending along the length of the chamber which is free to manipulate about an axis of revolution disposed parallel to the longitudinal axes of the cylinders and configured so as to have a lowermost elongated surface thereof extend in swinging-like fashion, above and along the surface of a screen carried within the chamber, and the screen being located above the valve. The apparatus also includes at least three veins, such veins extending substantially along the length of the two cylinders so as to have their distal most edges disposed substantially in contact with the surfaces of the cylinders, a pair of which at the uppermost region of each cylinder and the other of which having two free edges disposed in contacting relationship with the cylinders at regions substantially intermediate their opposed surfaces.

BRIEF DESCRIPTION OF THE DRAWINGS

In order that the present invention may be more fully understood it will now be described, by way of example, with reference to the accompanying drawings in which:

FIG. 1 is a perspective view of the preferred embodiment incorporating the principles of the present invention therein.

FIG. 2 is a sectional view of the preferred embodiment, taken along the lines 2—2 of FIG. 1, viewed in the direction of arrows 2—2.

FIG. 3 is a perspective view of a portion of the apparatus shown in FIG. 2.

FIG. 4 is a perspective view of a portion of the apparatus shown in FIG. 2.

FIG. 5 is a perspective view of a portion of the apparatus shown in FIG. 1.

FIG. 6 is a perspective view of a portion of the apparatus shown in FIG. 2.

DESCRIPTION OF THE PREFERRED EMBODIMENT

Referring now to the figures, and more particularly to FIG. 1, there is illustrated therein a rolling pin apparatus 10 having two handle portions 12. Handle portions 12 are shown to have undulations 14 suitable for grasping by the human hand. Cover 16 is shown engaged to structure 18 by straps 20 whose free edges, not shown, engage slots 22. By depressing the lowermost regions of straps 20, their free ends are disengaged from slots 22, and cover 16 may be moved upwardly and outwardly so as to be totally disengaged from structure 18. Cylinder 24 is shown extending substantially along the entire length of structure 18. Handle 26, shown extending upwardly above surface 28 of cover 16, is mounted in such a fashion that its uppermost end 30 may move in the direction of arrows 32, upon the manual manipulation of a user.

FIG. 2 illustrates cylinder 24 and its equivalent cylinder 34. Cover 16 is shown covering chamber 36, when straps 20 are disposed so as to have their outermost free edge 38 engage slots 22 in structure 16. Shown disposed within chamber 36 is filter element 40. Similarly disposed within chamber 36 is pendulum-like scraping element 42. Notch 44 is shown in the rearmost surface 46, of the rearmost wall 48, forming chamber 36. Vanes 50 and 52 are shown secured to structure 18 and are disposed over cylinders 24 and 34. Vanes 50 and 52 have free edges 54 and 56 which communicate with surfaces 58 and 60 of cylinders 24 and 34 respectively. Vertically disposed vane 62 is shown having free edges 64 and 66 disposed in touching engagement with surfaces 58 and 60 of cylinders 24 and 34, in a region intermediate their opposite faces. Apertures 68 are located at the bottom of structure 18, so as to permit dusting powder, not shown, otherwise contained in chamber 46, to pass outwardly therefrom, when apertures 68 are opened, allowing such dusting powder to fall on surfaces 70 and 72 of vanes 50 and 52 respectively, permitting such dusting powder to fall on the portion of surfaces 58 and 60 extending outwardly from edges 54 and 56 of vanes 50 and 52 respectively. Thus, such dusting powder, emanating out of the rightmost aperture 68, proceeds in the direction parallel to arrow 74 and then descends onto surface 60 of cylinder 34. In similar fashion, dusting powder, not shown, emanating out of the leftmost aperture 68, will extend in the direction of arrow 76, so as to fall on surface 58 of cylinder 24 outwardly from scraping edge 54.

In a use wherein the apparatus is moved in the direction of arrow 78, then, edge 56 will remove accumulated debris, as well as provided dusting powder, emanating out of rightmost aperture 68, permitting same to fall counter to the direction of surface 60 then being taken, that is, in the direction of arrow 80. Whilst the apparatus is being moved in the same direction, accumulated particles, accumulating on the free surface of cylinder 24 between edges 54 and 64, are removed by scraping edge 64 whilst during powder emanating outwardly from leftmost aperture 68 flows with the direction of travel of surface 58. In this fashion, as well as when the apparatus is being moved in the direction opposite to arrow 78, the region of both cylinders 24 and 34, disposed intermediate edges 54 and 64 and disposed intermediate edges 56 and 66, are kept substantially free of dusting powder and other accumulated debris or pills of worked food stuff.

FIG. 3 illustrates pendulum-like scraping element 42, shown having removable pins 84 located in the uppermost region thereof. One of pins 84 is utilized for engagement within notch 44, shown in FIG. 2. The other pin 84 is utilized in a wall disposed opposite to wall 48, such will being shown in FIG. 2. Pins 84 are insertable into holes 86 located in rod 88. Spring 90 is useful in breaking up the dusting powder, not shown, which it may communicate with, during the time that pendulum-like scraping element 42 is moving about a center of revolution indicated by dotted lines 92. Lowermost element 94 extends parallel to rod 88 and is shown having a passageway extending along the length thereof. Scraping surface 96 extends downwardly from lowermost element 94 and is adapted to slidably engage filter element 40, shown in FIGS. 2 and 6 so as to manipulate the dusting powder across the entire surface of such screen. Weight 98 is shown outwardly of lowermost element 94 and may be added by being inserted in lowermost element 94—if the dusting powder requires more agitation in order to dispense same outwardly and downwardly through filter element 40.

FIG. 4 illustrates a portion of the apparatus shown in FIG. 2, cut away, and in inverted position, so as to more clearly illustrate the elements thereof. Lines 100 and 102 depict the stem end of vanes 52 and 62, shown broken away. A portion of structure 18, comprising walls depicted in FIGS. 1 and 2, adapted to receive straps 20 are similarly broken away. Thus there remains apertures 68, shown disposed on the side useful in dispensing dusting powder over the uppermot surface of vane 52, there being another row of apertures 68, not shown. Rod 104 is shown extending along the length of structure 18, and is free to rotate in the direction of arrows 106. Handle 26 is shown secured to rod 104. As can be seen, rod 104 has flat surface 108, such that when flat surface 108 is disposed in a horizontal plane, wherein the remainder of rod 104 extends over such plane, in the location under such flat plane, as shown in FIG. 2, then, apertures 68 are opened and dusting powder may emerge therefrom. Contrariwise, when flat plane 108 is disposed in a horizontal plane and the balance of rod 104 is disposed over such flat plane, then, apertures 110, located in the lowermost regions of structure 18 will be closed, thereby shutting off the supply of dusting powder.

FIG. 5 illustrates the mechanism which is useful in supporting the cylinders 24 and 34 to structure 18, in journaled fashion. Handle 12 is shown fastened to end plate 112, which end plate is permanently secured to structure 18, by rivets at points 114. Sockets 116 are each adapted to receive bearing element 118, which are, in the preferred embodiment, sealed ball bearings. Such bearing elements 118, may be fabricated from an elastic material, such as rubber, to permit cylinders 24 and 34 to be moved about independently of one another by having their longitudinal axes displaced, when contacting a high or thick area of work piece. Shaft 120 is shown capable of engaging hole 122 of bearing element 118 such that shaft 120 is journaled therewithin whilst bearing element 118 is firmly fit within sockets 116. Collar 123 is a press fit on shaft 120, so as to prevent cylinder 34 from moving along the length of shaft 120. Not shown are another ball bearing 118, and its associated shaft 120 and cylinder 24, comprising the other cylinder needed to work the food stuff.

FIG. 6 shows a screen, whose length is configured to substantially conform with the length of chamber 36, shown in FIG. 2. It should be noted that such screen is disposed in a curve and such curve should substantially conform with the path taken by weight 98, shown in FIG. 3, so as to prevent clotting of the screen and constant manipulation of the food stuff on uppermost surface 124.

Therefore, one of the advantages of the present invention is a rolling pin apparatus which permits a user to apply two lines of downward work pressure to the work piece.

Another advantage of the present invention in an apparatus wherein all parts of the working tool contacting the food stuff to be worked, are covered by a fine dusting powder automatically as the work piece is manipulated.

Still another advantage of the present invention is an apparatus wherein the dusting powder is distributed evenly over the working surfaces of the device.

Yet another advantage of the present invention is an apparatus which permits easy cleaning, when not in use.

A further advantage of the present invention is an apparatus which automatically scrapes unwanted particles of food stuff from its food contacting rollers as such rollers are moved about the work piece by the user.

It will be understood that various changes in the details, materials, arrangements of parts and operating conditions which have herein been described and illustrated in order to explain the nature of the invention may be made by those skilled in the art within the principles and scope of the invention.

Having thus set forth the nature of the invention, what is claimed is:

1. A rolling pin apparatus comprising:
a pair of cylinders, said pair of cylinders being disposed in parallel alignment and journaled for independent free rotation to a structure, said structure having a hollow chamber disposed therewithin, said structure including a valve, said valve communicating to an interior portion of said chamber and to at least portions of each of said pair of cylinders when said valve is in an opened condition, a pair of handles, said pair of handles being fixedly secured to said structure and each being disposed substantially coaxially aligned, means to scrape portions of the surfaces of said pair of cylinders when said pair of cylinders are being caused to rotate about their longitudinal axes in any direction.

2. The apparatus as claimed in claim 1 wherein said handles include finger receiving undulations in the surfaces thereof.

3. The apparatus as claimed in claim 1 wherein said pair of cylinders are each hollow tubes.

4. The apparatus as claimed in claim 1 further comprising at least one bearing, said at least one bearing being secured to said structure, said at least one bearing having elastic properties, said at least one bearing being configured to provide rotational support for at least one end of at least one of said pair of cylinders.

5. The apparatus as claimed in claim 1 further comprising a screen, said screen being disposed within said chamber, said screen disposed substantially covering openings in said valve communicating with said chamber.

6. The apparatus as claimed in claim 5 further comprising means wherein said screen may be removably engaged within said chamber.

7. The apparatus as claimed in claim 5 further comprising an elongated pendulum, said elongated pendulum being disposed within said chamber, said pendulum being journaled for oscillations within said chamber along a center of revolution extending parallel to the longitudinal axes of said pair of cylinders.

8. The apparatus as claimed in claim 7 further comprising means wherein said pendulum-like structure may be removably installed within said chamber.

9. The apparatus as claimed in claim 7 further comprising an edge of said pendulum, said edge of said pendulum extending substantially along the length thereof, said edge of said pendulum being in the lowermost regions of said pendulum and configured for touching and scraping engagement with a surface of said screen when said pendulum is disposed in motion.

10. The apparatus as claimed in claim 9 further comprising means to selectively weight said pendulum.

11. The apparatus as claimed in claim 9 wherein said means to scrape comprises at least a pair of sheet-like elements, said at least a pair of sheet-like elements secured to said structure, the distal most end of said at least a pair of sheet-like elements each being disposed in touching engagement with said pair of cylinders.

12. The apparatus as claimed in claim 11 wherein said at least a pair of sheet-like elements are disposed intermediate said pair of cylinders and said apertures communicating with said chamber.

13. The apparatus as claimed in claim 12 further comprising another sheet-like element, said another sheet-like element being secured to said structure, said another sheet-like element having two elongated distal most edges, said two elongated distal most edges extending substantially along the entire length of said pair of surfaces, said two elongated distal most edges being in touching engagement with said pair of cylinders in regions disposed intermediate opposed surfaces thereof.

* * * * *